United States Patent
Sawagami et al.

(10) Patent No.: US 6,947,230 B2
(45) Date of Patent: Sep. 20, 2005

(54) MOLDED LENS HAVING AN OUTER CIRCUMFERENCE AND FIRST AND SECOND OPTICAL SURFACES WITH CUT OFF PERIPHERAL PORTIONS, AND MOLDING DIE FOR THE MOLDED LENS

(75) Inventors: Akira Sawagami, Sagamihara (JP); Teruhiko Itoh, Hachioji (JP); Toshiyuki Kojima, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/785,533

(22) Filed: Feb. 23, 2004

(65) Prior Publication Data

US 2004/0169939 A1 Sep. 2, 2004

(30) Foreign Application Priority Data

Feb. 28, 2003 (JP) ........................................ 2003-054304

(51) Int. Cl.⁷ ............................ G02B 7/02; B29D 17/00
(52) U.S. Cl. ...................................... 359/819; 264/1.33
(58) Field of Search ................................ 359/819, 821, 359/642; 369/112.23; 264/1.33, 2.1, 2.7

(56) References Cited

U.S. PATENT DOCUMENTS 4,836,960 A * 6/1989 Spector et al. ............... 264/2.2
5,329,406 A * 7/1994 Nakanishi et al. ........... 359/811

FOREIGN PATENT DOCUMENTS

JP           11-52108      *  2/1999  ............ G02B/3/00
JP       2002-243915 A        8/2002

OTHER PUBLICATIONS

Translation of JP11–52108.*

* cited by examiner

Primary Examiner—Georgia Epps
Assistant Examiner—Alicia M Harrington
(74) Attorney, Agent, or Firm—Frishauf, Holtz, Goodman & Chick, P.C.

(57) ABSTRACT

A molded lens used in an optical pickup device provided with a plane of incidence having a first optical surface and a plane of emergence having a second optical surface, and a form of an outer circumference of the molded lens is formed by a first straight line portion which is in parallel substantially with a plane including an optical axis, a second straight line portion which is in parallel with the first straight line portion and is symmetric with the first straight line portion about the plane and by two circular arcs each connecting end portions of the first and second straight line portions. A part of a fringe of each of the first and second optical surfaces is substantially in a form of a circle whose center is on the optical axis is cut off by each of the first and second straight line portions.

3 Claims, 4 Drawing Sheets

PRIOR ART

MOLDED LENS HAVING AN OUTER CIRCUMFERENCE AND FIRST AND SECOND OPTICAL SURFACES WITH CUT OFF PERIPHERAL PORTIONS, AND MOLDING DIE FOR THE MOLDED LENS

BACKGROUND OF THE INVENTION

The present invention relates to a molded lens used in an optical pickup device and to a molding die for the molded lens.

An optical pickup device used for recording and reproducing of information employing an optical information recording medium (an optical disc) is constructed by combining various types of optical elements such as an objective lens, a collimator, a coupling lens and others.

These optical elements are formed by injecting melted resins in a cavity of a molding die for molding a lens, in many cases. Hereafter, in the present specification, an optical element manufactured through injection molding employing a molding die is expressed as "a molded lens".

With miniaturization of an optical pickup device in recent years, there are disclosed various technologies about miniaturization of a molded lens that constitutes an optical pickup device (see TOKKAI No. 2002-243915 for example).

A molded lens described in TOKKAI No.2002-243915 is a lens having an outer form that is in a circular shape whose center is on an optical axis wherein outer circumference portions on the top and the bottom of the lens are cut off, and either one optical surface of both optical surfaces including the surface of incidence (first surface) and the surface of emergence (second surface) is cut off and the other optical surface is not cut off, namely, an outer circumference of the other optical surface is kept to be in a circular form. By cutting off the outer circumference portions on the top and the bottom of the lens, a length (height) of the molded lens in the direction perpendicular to the optical axis of the molded lens can be shortened, and miniaturization of the lens itself can be attained.

However, further miniaturization of the optical pickup device is demanded in recent years, and there is caused a problem that a molded lens which is smaller than the molded lens in TOKKAI No.2002-243915 is demanded.

As shown in FIG. 4(a), on ordinary molded lens 100 having an outer shape in a circular form, there is provided bracket 102 for holding the lens at the position to cover the outer circumference of optical functional surface 101. The symbol 200 is a box-shaped cartridge for housing therein a plurality of lenses 100, and on a part of left and right wall members 201, there is provided a vacant space 202 that extends in the longitudinal direction (the direction perpendicular to the page). Then, by holding brackets 102 on both left and right sides in the vacant space 202, a plurality of lenses 100 are housed in the longitudinal direction the cartridge 200, in the structure.

On the molding die used for injection molding, there is usually provided a hole through which air in the cavity is driven out when melted resins are injected in the cavity. Therefore, when melted resins entered a part of this hole are solidified when molding a lens, "a flash" which is projected slightly from the surface is generally formed on the molded lens.

Though this flash is sometimes projected in the radial direction from the outer circumference of the lens, it is hardly caused that flashes on adjoining two molded lenses 100 touch each other to be damaged, because each lens 100 is rotatable freely on a horizontal plane crossing the optical axis at right angles under the condition that the lens is held in the vacant space 202, even when ordinary molded lenses 100 each having a circular outer form are housed continuously in cartridge 200.

However, in the case of molded lens 300 whose outer circumference portion is cut out (see FIGS. 4(b) and 4(c)) such as one described in TOKKAI No. 2002-243915, a plurality of lenses 300 are held by causing the cut out portion to touch a part of left and right wall members 201 of the box-shaped cartridge.

In this case, when flash 301 (see FIG. 4(b)) is projected from an outer circumference (a portion other than a cut out portion) of lens 300, in the radial direction, there has been a fear that flashes 301 on the two adjoining molded lenses touch each other to be damaged, and a part of the damaged flash 301 is stuck on the optical surface of lens 300, because a movement of each lens 300 is regulated in a horizontal plane that crosses the optical axis at right angles by left and right wall members 201.

Further, there is an occasion where flash 301 is formed to be projected in the optical axis direction from the surface of lens 300, and even in this case, there is a problem of damage of flash 301 in the cartridge 200, and there is a problem that positioning accuracy is worsened by flash 301 when flash 301 is formed on the surface (reference surface) on the side used for positioning among both surfaces of lens 300, for example.

SUMMARY OF THE INVENTION

An object of the invention is to provide a molded lens for an optical pickup device wherein the aforementioned problems are taken into consideration, miniaturization is possible and an adverse effect caused by a flash can be controlled, and to provide a molding die for the molded lens.

The object mentioned above can be attained by either one of the following Structures (1)–(10).

Structure (1) is a molded lens used in an optical pickup device in which a plane of incidence having a first optical surface and a plane of emergence having a second optical surface are provided, and a form of an outer circumference of the molded lens is formed by a first straight line portion which is in parallel substantially with a plane including an optical axis, a second straight line portion which is in parallel with the first straight line portion and is symmetric with the first straight line portion about the above-mentioned plane and by two circular arcs each connecting end portions of the first and second straight line portions, wherein a part of a fringe of each of the first and second optical surfaces each being substantially in a form of a circle whose center is on the optical axis is cut off by each of the first and second straight line portions.

In the Structure (1), not only an outer circumference form but also the first and second optical surfaces are cut off by the first and second straight line portions, and thereby, the molded lens can be miniaturized.

Structure (2) is the molded lens described in Structure (1), wherein R1=R2 and 1>H/R1>2 are satisfied when radiuses of curvature of the aforementioned two circular arc portions are prescribed respectively as R1 and R2, and a distance between the first straight line portion and the second straight line portion is prescribed as H.

In the Structure (2), the same effect as in Structure (1) is obtained, and miniaturization of a molded lens can be attained sufficiently by making a ratio (H/R1), in which H is the length of the portion which is made to be shorter by cutting off a part of a substantially circular molded lens having a radius R1 whose center is on an optical axis to the radius R1, to be small. However, if the ratio is established to be too small, the molded lens becomes longer in the direction perpendicular to the optical axis, and there is a fear that melted resins cannot be filled completely in the cavity in the course of injection molding.

Structure (3) is a molded lens described in Structure (1), wherein R1=R2, 1>H1/R1>2 and |H1–H2|≧0.1 are satisfied when radiuses of curvature of the aforementioned two circular arc portions are prescribed respectively as R1 and R2, a distance between peripheral portions of the first optical surface that is in a form of a circle whose center is on an optical axis and is cut off by the first straight portion and the second straight portion is prescribed as H1, and a distance between peripheral portions of the second optical surface that is in a form of a circle whose center is on an optical axis and is cut off by the first straight portion and the second straight portion is prescribed as H2.

In the Structure (3), the same effect as in Structure (1) is obtained, and when a molding die (first molding die) for molding a portion of a molded lens including a plane of incidence and a molding die (second molding die) for molding a portion of the molded lens including a plane of emergence are united in the course of injection molding operations, it is possible to absorb a relative positional deviation caused between the above-mentioned two molding dies, and thereby to improve work efficiency of injection molding operations, by making |H1–H2|≧0.1 to hold, namely, by making a difference between H1 and H2 to be 0.1 or more.

Further, miniaturization of a molded lens can be attained sufficiently by making a ratio (H1/R1), in which H1 is the length of the portion which is made to be shorter by cutting off a part of a substantially circular molded lens having a radius R1 whose center is on an optical axis to the radius R1, to be small. However, if the ratio is established to be too small, the molded lens becomes longer in the direction perpendicular to the optical axis, and there is a fear that melted resins cannot be filled completely in the cavity in the course of injection molding.

Structure (4) is a molded lens used in an optical pickup device in which a plane of incidence having a first optical surface and a plane of emergence having a second optical surface are provided, and a form of an outer circumference of the molded lens is formed by a first straight line portion which is in parallel substantially with a plane including an optical axis, a second straight line portion which is in parallel with the first straight line portion and is symmetric with the first straight line portion about the above-mentioned plane and by two circular arcs each connecting end portions of the first and second straight line portions, wherein R1=R2 and 1<H/R1<2 are satisfied when radiuses of curvature of the aforementioned two circular arc portions are prescribed respectively as R1 and R2, and a distance between the first straight line portion and the second straight line portion is prescribed as H.

In the Structure (4), miniaturization of a molded lens can be attained sufficiently by making a ratio (H/R1), in which H is the length of the portion which is made to be shorter by cutting off a part of a substantially circular molded lens having a radius R1 whose center is on an optical axis to the radius R1, to be small. However, if the ratio is established to be too small, the molded lens becomes longer in the direction perpendicular to the optical axis, and there is a fear that melted resins cannot be filled completely in the cavity in the course of injection molding.

Structure (5) is a molded lens used in an optical pickup device in which a plane of incidence having a first optical surface and a plane of emergence having a second optical surface are provided, and a form of an outer circumference of the molded lens is formed by a first straight line portion which is in parallel substantially with a plane including an optical axis, a second straight line portion which is in parallel with the first straight line portion and is symmetric with the first straight line portion about the above-mentioned plane and by two circular arcs each connecting end portions of the first and second straight line portions, wherein a flash that is caused when melted resins enter an air vent port provided in a molding die cavity and are solidified in the course of manufacturing the molded lens through injection molding is formed to be projected from a side of at least one of the two circular arc portions, and the flash does not project from a tangent line that passes through the point of intersection where an imaginary straight line that passes through and crosses at right angles an optical axis and extends in the direction which is in parallel with the first and second straight line portions crosses the circular arc portion.

In the Structure (5), the flash does not project from a tangent line that passes through the point of intersection where the imaginary straight line that passes through the optical axis, intersects the optical axis at right angles and extends in the direction that is in parallel with the first and second straight line portions crosses the circular arc portion. Therefore, even in the case of holding a plurality of molded lenses in a box-shaped cartridge by making the first and second straight line portions to touch a part of left and right wall members, adjoining two molded lenses touch each other on their circular arc portions, and it does not happen that a flash touches that of its neighboring molded lens. It is therefore possible to prevent in advance that flashes touch each other and a part of the damaged flash sticks to an optical surface of the molded lens.

Structure (6) is the molded lens described in Structure (5), wherein a length of the flash in the direction of an optical axis is 0.03 mm or less.

Structure (7) is the molded lens described in Structure (5) or Structure (6), wherein the flash is formed on a circular arc portion on one side among the two circular arc portions.

In the Structure (6) or (7), it is possible to prevent securely that flashes touch each other.

Structure (8) is a molding die for molding a molded lens which is described in either one of Structures (5)–(7), wherein a first molding die for molding a portion including a plane of incidence of the molded lens and a second molding die for molding a portion including a plane of emergence of the molded lens are provided, and the air vent port is formed on either one of the first and second molding dies.

In the Structure (8), the same effect as that of either one of Structures (5)–(7) can be obtained.

Structure (9) is a molded lens for an optical pickup device equipped with a plane of incidence having a first optical surface, a plane of emergence having a second optical surface and with a flange portion that covers the fringe of the plane of incidence and that of the plane of emergence, wherein either one of the surface of the flange portion on the side of the plane of incidence and the surface of the flange portion on the side of the plane of emergence is made to be the reference surface used for positioning a molded lens, the reference surface is formed to be projected from the plane of incidence or the plane of emergence in the direction of an optical axis, a molded lens molding die for manufacturing the molded lens is provided with a sleeve and a core that moves in the direction of the optical axis relatively with the sleeve to push the molded lens out of the molding dye while it keeps touching the molded lens after injection molding, and a flash generated when melted resins enter a vacant space that is formed on a contact portion between the sleeve and the core and are solidified, in the course of manufacturing the molded lens through injection molding, projects in the optical axis direction from the fringe of the plane of incidence or the plane of emergence and does not project in the optical axis direction from the reference surface.

In the Structure (9), it is possible to prevent damage of a flash in a cartridge in advance and to prevent the situation that positioning accuracy for the molded lens is worsened by a flash formed on the reference surface.

Structure (10) is a molding die for molded lens for molding the molded lens that is described in Structure (9), wherein a first molding die for molding a portion including a plane of incidence of the molded lens and a second molding die for molding a portion including a plane of emergence of the molded lens are provided, and either one of the first and second molding dies is composed of the sleeve and the core.

In the Structure (10), the same effect as that in Structure (9) can be obtained.

DETAILED DESCRIPTION (First Embodiment)

Figure 1:
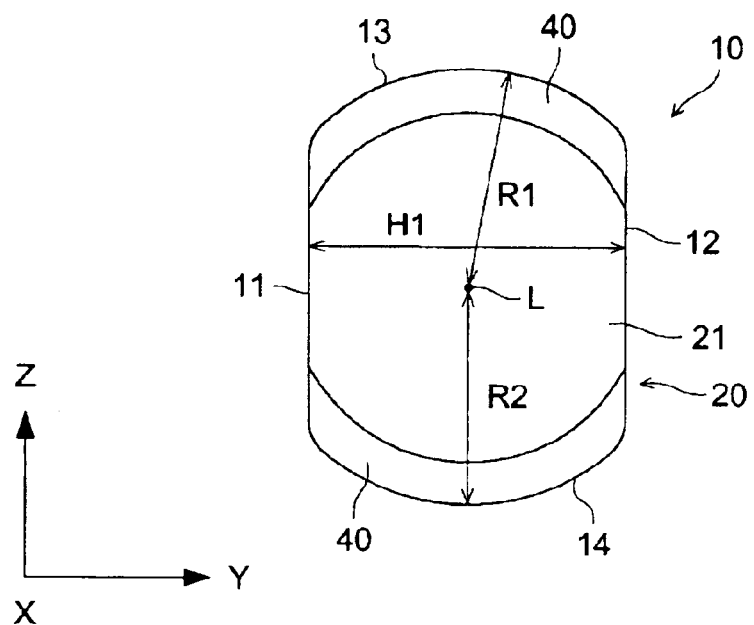
FIGS. 1(a) and 1(b) are plan views of the primary portions showing a plane of incidence and a plane of emergence of a molded lens, respectively, in the first embodiment.
Figure 1:
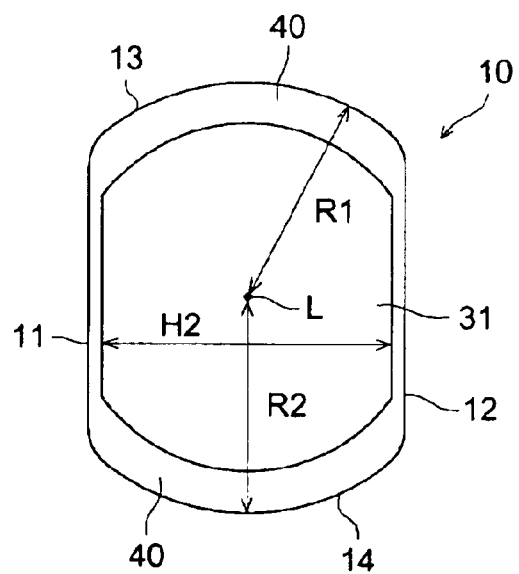

An embodiment of the molded lens of the invention will be explained as follows, referring to the drawings.

Incidentally, in each drawing, let it be assumed that x represents a direction of optical axis L of the molded lens, y represents a direction that is perpendicular to the optical axis L and z represents a direction perpendicular to the direction X and the direction y.

As shown in FIGS. 1(a) and 1(b), molded lens 10 is provided with plane of incidence 20, plane of emergence 30 and flange portion 40.

Further, among optical surfaces of the molded lens 10, it is assumed that an optical surface on the part of the plane of incidence 20 is first optical surface 21, while an optical surface on the part of the plane of emergence 30 is second optical surface 31.

An outer circumference of the molded lens 10 is formed by first straight line portion 11 which is in parallel substantially with a plane (X—Z plane) including optical axis L, second straight line portion 12 which is in parallel with the first straight line portion 11 and is symmetric with the first straight line portion 11 about the plane including optical axis L and by two circular arc portions 13 and 14 each connecting end portions of the first and second straight line portions 11 and 12. As stated above, the outer circumference of the molded lens 10 is in a shape that is formed by cutting off a mostly circular form having its center on optical axis L with the first and second straight line portions 11 and 12.

Further, on the part of the plane of incidence 20, a part of the fringe of mostly circular first optical surface 21 having its center on optical axis L is cut off by the first and second straight line portions 11 and 12, and on the part of the plane of emergence 30, a part of the fringe of mostly circular second optical surface 31 having its center on optical axis L is cut off by the first and second straight line portions 11 and 12.

As stated above, with respect to the molded lens 10 of the invention, not only its outer circumference form is cut off by the first and second straight line portions, but also the first and second optical surfaces 21 and 31 are cut off by the first and second straight line portions, and thereby, the molded lens can further be miniaturized.

Incidentally, a light flux arrives at a cutout portion of the first optical surface 21 among light fluxes emitted from a light source and arrive at the plane of incidence 20 does not emerge from the second optical surface 31 of the plane of emergence 30 and does not form a light-converged spot on an information recording surface of an optical information recording medium. Ordinarily, however, all light fluxes emitted from a light source do not always form a light-converged spot, and for example, light fluxes passing through an area other than those with the necessary numerical aperture are intercepted by a diaphragm arranged in the vicinity of a plane of incidence of an objective lens. Therefore, even if the light flux arrives at a cutout portion of the first optical surface 21 is not utilized for forming a light-converged spot as stated above, the efficiency of an optical pickup device is not worsened. Incidentally, a distance between the first straight line portion 11 and the second straight line portion 12 is adjusted appropriately by a design based on a type of the optical information recording medium in which the optical pickup device is used and on a wavelength of the light flux.

It is preferable to design a lens so that $R1=R2$, $1<H1/R1<2$ and $|H1-H2|\geq 0.1$ are satisfied under the assumption that $R1$ and $R2$ represent respectively radiuses of curvature of two circular arc portions 13 and 14, $H1$ represents a width of a portion cut off by the first straight line portion 11 and the second straight line portion 12 on a fringe portion of a mostly circular first optical surface 21 having its center on optical axis L, and $H2$ represents a width of a portion cut off by the first straight line portion 11 and the second straight line portion 12 on a fringe portion of a mostly circular second optical surface 31 having its center on optical axis L.

By making a ratio ($H1/R1$), in which $H1$ is the length of the portion which is made to be shorter by cutting off a part of a substantially circular molded lens 10 having a radius $R1$ whose center is on optical axis L to the radius $R1$, to be smaller than 2, miniaturization of molded lens 10 can be attained sufficiently, and by making the ratio to be greater than 1, it is possible to prevent the molded lens 10 from becoming excessively long in the Z direction. If the ratio $H1/R1$ is established to be smaller than 1, there is a fear that the molded lens 10 becomes longer in the Z direction, and melted resins cannot be filled completely in the cavity in the course of injection molding.

Further, by making |H1–H2|>0.1 to hold, namely, by making a difference between H1 and H2 to be 0.1 or more, when a molding die (first molding die) for molding a portion including plane of incidence 20 of molded lens 10 and a molding die (second molding die) for molding a portion including plane of emergence 30 of the molded lens 10 are united in the course of injection molding operations, it is possible to absorb a relative positional deviation caused between the above-mentioned two molding dies, and thereby to improve work efficiency of injection molding operations.

Incidentally, it is also possible to design a lens so that R1=R2 and 1<H1/R1<2 may be satisfied under the condition of H1=H2.

Further, the molded lens 10 shown in the present embodiment can be used preferably for a collimator, a coupling lens, a correction plate and an objective lens having a relatively small image-side numerical aperture (NA is about 0.45), for example, which constitute an optical pickup device.

(Second Embodiment)

Figure 2:
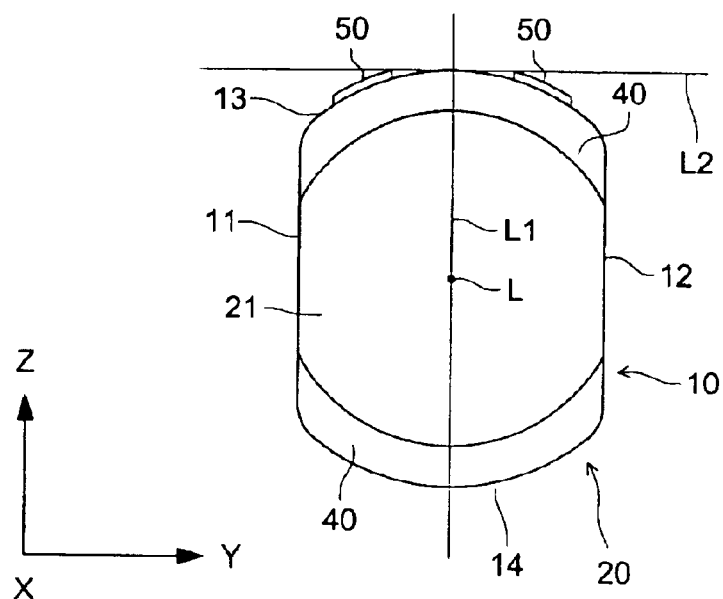
FIGS. 2(a) and 2(b) represent plan views of the primary portions showing a plane of incidence and a plane of emergence of a molded lens in the second embodiment, respectively.
FIG. 2(c) represents a side view of primary portions on the part of the plane of incidence.
Figure 2:
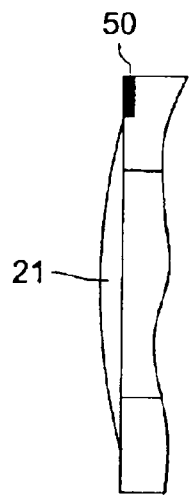
Figure 2:
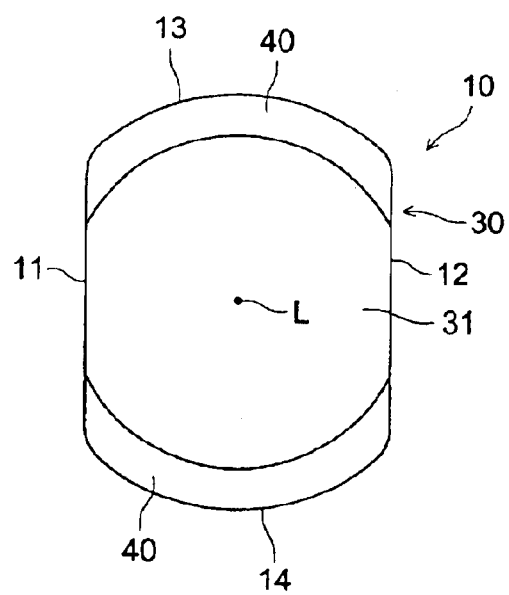

An embodiment of the molded lens 10 and a molding die for the molded lens relating to the invention will be explained as follows, referring to FIGS. 2(a)–2(c).

In the same way as in the molded lens 10 of the First Embodiment mentioned above, an outer peripheral shape of molded lens 10 in the present embodiment is formed by first straight line portion 11, second straight line portion 12 and two circular arc portions 13 and 14. Incidentally, flange portion 40 is formed on the position that covers peripheries of plane of incidence 20 and plane of emergence 30.

A part of a fringe for each of first optical surface 21 and second optical surface 31 each being substantially in a circular form having its center on optical axis L is cut off by the first and second straight line portions 11 and 12. Incidentally, in the molded lens 10 in the present embodiment, a part of a fringe of an optical surface on at least one of the first optical surface 21 and the second optical surface 31 has only to be cut off by the first and second straight line portions 11 and 12.

A flash that is caused when melted resins enter an air vent port provided in a molding die cavity and are solidified in the course of manufacturing the molded lens 10 through injection molding is formed to be projected from two portions on a side of one circular arc portion among two circular arc portions 13 and 14. Incidentally, detailed explanation for flash 50 will be omitted here because is widely known.

Each flash 50 is provided not to project from tangent line L2 that passes through the point of intersection where imaginary straight line L1 (straight line that passes through optical axis L and extends in the Z direction) crossing optical axis L at right angles crosses circular arc portions 13 and 14.

Even in the case of holding a plurality of molded lenses in a box-shaped cartridge by making the first and second straight line portions to touch a part of left and right wall members, adjoining two molded lenses 10 touch each other on their circular arc portions 13 and 14, and it does not happen that a flash 50 touches the neighboring flash, by providing flash 50 as stated above. It is therefore possible to prevent in advance that a part of the damaged flash 50 caused by mutual touching of flashes 50 is stuck on the optical surface of the molded lens 10.

Incidentally, it is preferable that a length of flash 50 in the direction of optical axis L is made to be 0.03 mm or less, and the flash is provided on a circular portion of one of two circular portions 13 and 14. By providing flash 50 to satisfy the aforesaid condition, it is possible to prevent surely the mutual touching of flashes 50.

For molding the molded lens 10 having the flash 50 mentioned above, an air vent port has only to be provided in a cavity of either one molding die among the first molding die for molding a portion including plane of incidence 20 of molded lens 10 and the second molding die for molding a portion including plane of emergence 30 of molded lens 10, both constituting a molding die (molding die for molded lens).

Incidentally, the molded lens 10 shown in the present embodiment can be used preferably for a collimator and an objective lens which constitute an optical pickup device.

(Third Embodiment)

Next, an embodiment of the molded lens 10 and molding die for the molded lens 60 relating to the invention will be explained as follows.

In the same way as in the molded lens 10 of the Second Embodiment mentioned above (refer to FIGS. 2(a) to 2(c)), an outer peripheral shape of the molded lens 10 in the present embodiment is formed by first straight line portion 11, second straight line portion 12 and two circular arc portions 13 and 14. Further, a part of a fringe for each of first optical surface 21 and second optical surface 31 each being substantially in a circular form having its center on optical axis L is cut off by the first and second straight line portions 11 and 12. Incidentally, in the molded lens 10 in the present embodiment, a part of a fringe of the first optical surface 21 and the second optical surface 31 does not need to be cut off by the first and second straight line portions 11 and 12, and the molded lens may also be molded lens 10 having an outer form that is substantially in a circular form having its center on optical axis L which is used generally.

Further, flange portion 40 is formed on the position that covers peripheries of plane of incidence 20 and plane of emergence 30.

Figure 3:
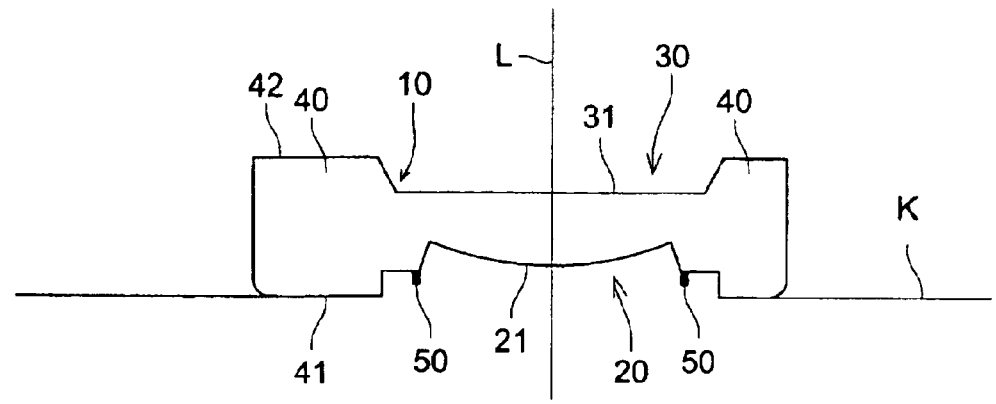
FIGS. 3(a) represents a longitudinal section of primary portions of a molded lens and FIG. 3(b) is a longitudinal section of primary portions of a molding die for molded lens both in the third embodiment.
Figure 3:
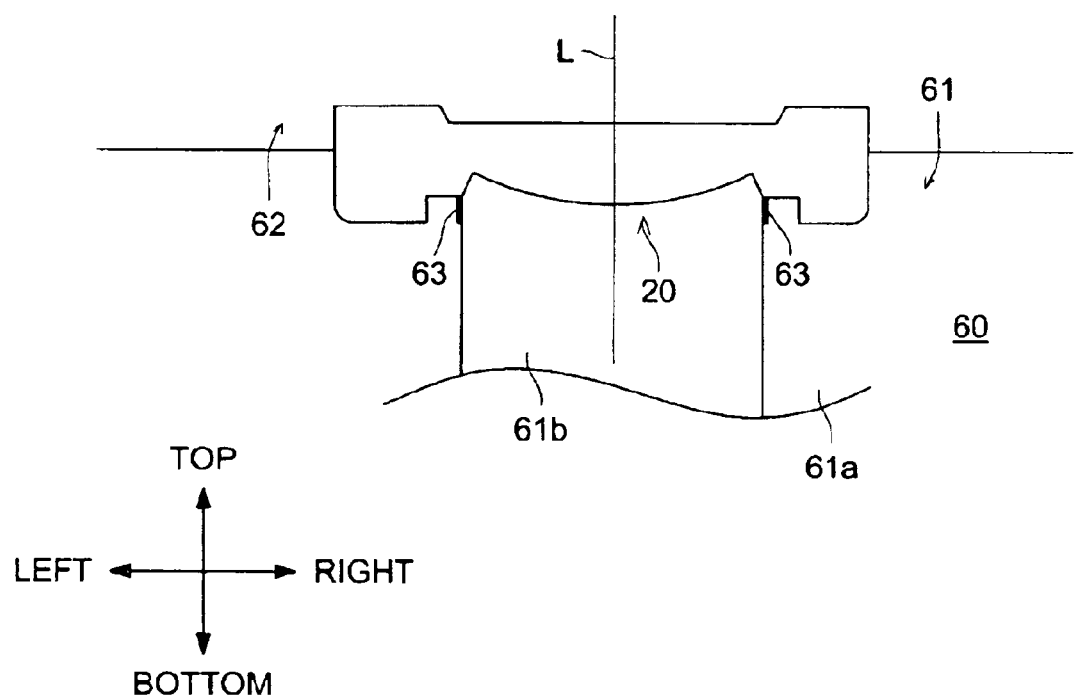
Figure 4:
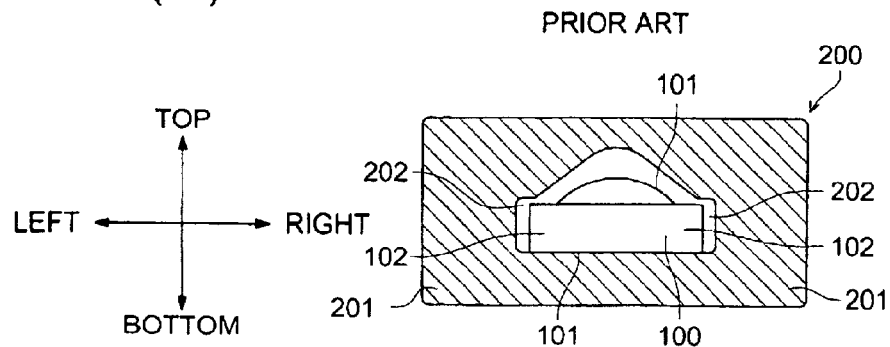
FIG. 4(a) is a longitudinal section of primary portions of a cartridge for holding a conventional circular molded lens.
FIG. 4(b) is a plan view for primary portions of a cartridge for holding a molded lens whose one portion is cut off.
FIG. 4(c) is a longitudinal section for primary portions of the cartridge.
Figure 4:
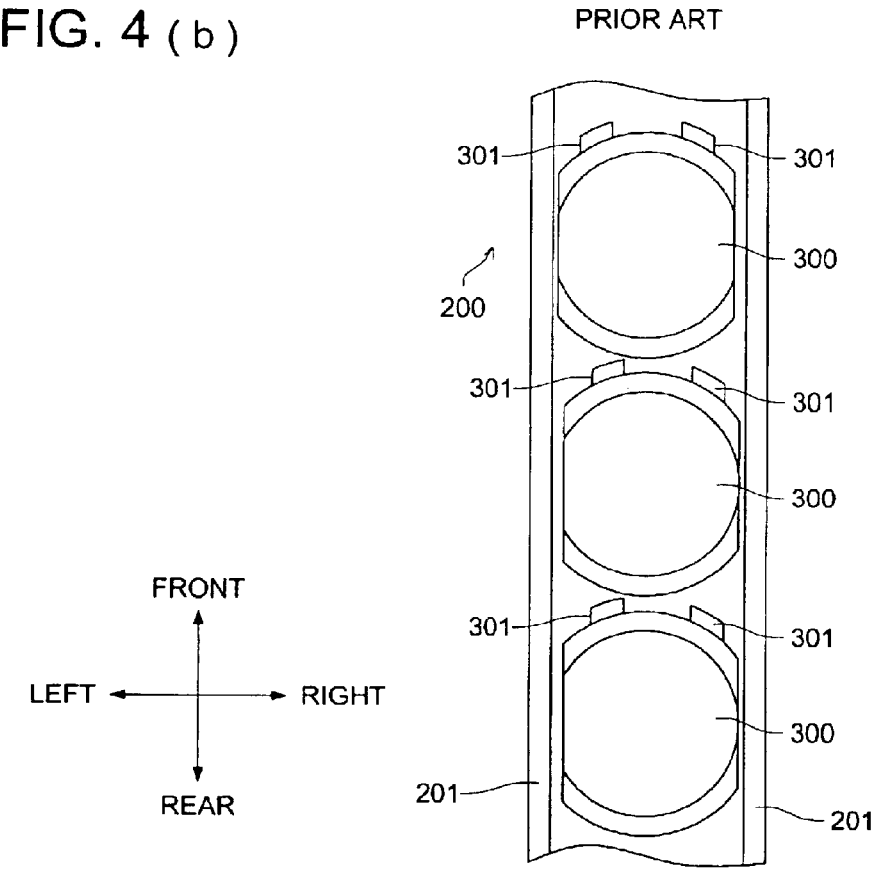
Figure 4:
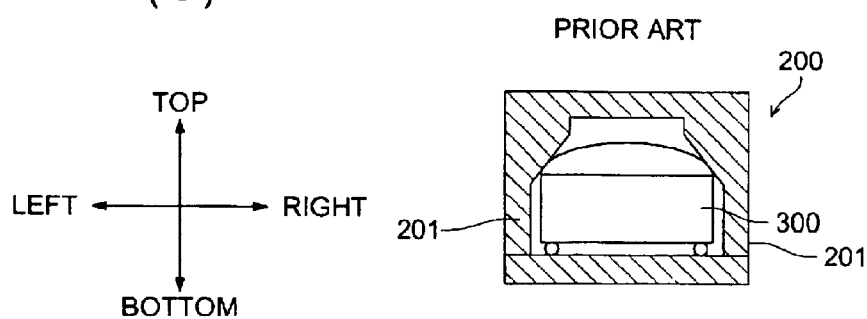

As shown in FIG. 3(a), either one (surface 41 on the plane of incidence side in the present embodiment) of surface 41 on the plane of incidence side of flange portion 40 and surface 42 on the plane of emergence side is made to be reference surface K for positioning the molded lens 10.

The reference surface K is formed to project from the plane of incidence 20 in the direction of optical axis L.

As shown in FIG. 3(b), first molding die 61 for molding a portion including plane of incidence 20 of molded lens 10 is composed of sleeve 61a and core 61b that pushes the molded lens 10 out of the molding die by moving relatively to the sleeve 61a in the direction of optical axis L, while touching the plane of incidence 20 of molded lens 10 after injection molding.

Molding die for molded lens 60 is composed of the first molding die 61 and second molding die 62 for molding a portion including plane of emergence 30 of molded lens 10.

Ordinarily, for moving (sliding) the core 61b smoothly, there is provided vacant space 63 on a contact portion between the upper end portion of an inner circumferential surface of the sleeve 61a and the upper end portion of an outer circumferential surface of the core 61b.

Further, this vacant space 63 is used not only for securing sliding property of the core 61b but also for air vent in the case of injection of melted resins in a cavity of the molding die.

Therefore, by adjusting a length of the vacant space 63 in the direction of optical axis L, it is possible to provide the flash 50 that is caused when melted resins enter the vacant space 63 and are solidified, so that the flash may project from a periphery of the plane of incidence 20 in the direction of optical axis L and may not project from the reference surface K in the direction of optical axis L.

Due to this, it is possible to prevent damage of flash 50 in a cartridge in advance, for example, and to prevent the situation that positioning accuracy for the molded lens 10 is worsened by a flash 50 formed on the reference surface.

Incidentally, the molded lens 10 shown in the present embodiment can be used preferably for a collimator, a coupling lens, a correction plate and an objective lens, for example, which constitute an optical pickup device.

The invention makes miniaturization of a molded lens to be possible, and prevents damage of a flash and a change for the worse of positioning accuracy caused by the flash.

What is claimed is:

1. A molded lens for use in an optical pickup device, said molded lens comprising:
   (a) a plane of incidence including a first optical surface;
   (b) a plane of emergence including a second optical surface provided on an opposite side of the molded lens with respect to the plane of incidence; and
   (c) an outer circumference surface having a shape formed by: (i) a first straight line portion which is substantially parallel to a plane including an optical axis of the molded lens, (ii) a second straight line portion which is substantially parallel with the first straight line portion is symmetric with the first straight line portion about the plane including the optical axis of the molded lens, and (iii) two circular arcs each connecting end portions of the first and second straight line portions;
   wherein each of the first and second optical surfaces has a shape substantially corresponding to a respective circle having a center on the optical axis and having outer portions thereof cut off by the respective first and second straight line portions; and
   wherein the following numerical expressions are satisfied:

$$R1=R2 \text{ and } 1<H/R1<2$$

where R1 and R2 represent respective radiuses of curvature of the two circular arc portions, and H represents a distance between the first straight line portion and the second straight line portion.

2. A molded lens, for use in an optical pickup device, said molded lens comprising:
   (a) a plane of incidence including a first optical surface;
   (b) a plane of emergence including a second optical surface provided on an opposite side of the molded lens with respect to the plane of incidence; and
   (c) an outer circumference surface having a shape formed by: (i) a first straight line portion which is substantially parallel to a plane including an optical axis of the molded lens, (ii) a second straight line portion which is substantially parallel with the first straight line portion and is symmetric with the first straight line portion about the plane including the optical axis of the molded lens, and (iii) two circular arcs each connecting end portions of the first and second straight line portions;
   wherein each of the first and second optical surfaces has a shape substantially corresponding to a respective circle having a center on the optical axis and having fringe portions thereof cut off by the respective first and second straight line portions; and
   wherein the following numerical expressions are satisfied $$R1=R2, \ 1<H1/R1<2 \text{ and } |H1-H2| \geq 0.1$$

where R1 and R2 represent respective radiuses of curvature of the two circular arc portions, H1 represents a distance between the fringe portions of the first optical surface, and H2 represents a distance between the fringe portions of the second optical surface.

3. A molded lens for use in an optical pickup device, said molded lens comprising:
   (a) a plane of incidence including a first optical surface;
   (b) a plane of emergence including a second optical surface provided on an opposite side of the molded lens with respect to the plane of incidence; and
   (c) an outer circumference surface having a shape formed by: (i) a first straight line portion which is substantially parallel to a plane including an optical axis of the molded lens, (ii) a second straight line portion which is substantially parallel to the first straight line portion and is symmetric with the first straight line portion about the plane including the optical axis of the molded lens, and (iii) by two circular arcs each connecting end portions of the first and second straight line portions;
   wherein the following numerical expressions are satisfied:

$$R1=R2 \text{ and } 1<H/R1<2$$

where R1 and R2 represent respective radiuses of curvature of the two circular arc portions, and H represents a distance between the first straight line portion and the second straight line portion.

* * * * *